Oct. 26, 1965    R. E. POETHIG ETAL    3,214,054
LOCKING RING FOR DEMOUNTABLE BOWLS SUBJECTED TO PRESSURE
Original Filed April 15, 1963

INVENTORS:
Robert E. Poethig
Walter E. Draxler
Edward W. Veres
BY
Watson D. Harbaugh
ATT'Y.

United States Patent Office 3,214,054
Patented Oct. 26, 1965

3,214,054
LOCKING RING FOR DEMOUNTABLE BOWLS SUBJECTED TO PRESSURE
Robert E. Poethig, Glenview, and Walter E. Draxler and Edward W. Veres, Arlington Heights, Ill., assignors to The Bastion-Blessing Company, Chicago, Ill., a corporation of Illinois
Original application Apr. 15, 1963, Ser. No. 272,991. Divided and this application Nov. 10, 1964, Ser. No. 410,136
4 Claims. (Cl. 220—46)

This application is a divisional application of Serial No. 272,991, which was filed April 15, 1963, now abandoned.

The present invention relates to an improved system for lubricating pneumatically operated devices by supplying lubricant to the compressed air that powers the devices and particularly to readily disengageable locking rings for airline bowls subjected to pressure.

In the system contemplated by the present invention, an airline device having a removable bowl or reservoir connected in the air stream that powers pneumatic tools, is provided with a locking ring that is readily attached and detached for supporting the bowl in sealed relationship on the device under airline pressure.

An object of the present invention is to provide a simple arrangement by which a pressurized storage chamber can be removed, replenished and remounted, quickly and easily with very little loss of air pressure.

A further object of the invention is to provide a pneumatic air line lubricator and bowl release support arrangement which is easy to install, service and maintain yet is rugged and simple in its construction and operation for handling by unskilled employees.

These being among the objects of the invention, other and further objects will become apparent to those skilled in the art from the description and the accompanying drawings relating thereto, wherein.

The lubricator shown for purposes of describing the invention embodies oil drop feeding with mist injection under a pressure differential. The higher pressure is created on the upstream side and is imposed upon a lubricant reservoir, preferably in a metered relationship. An air by-pass is controlled to provide a regulated differential pressure in the oil reservoir. A locking ring supports the reservoir in sealed relationship on the body while the pressure is on and can be quickly released and reattached for movement of the reservoir vertically when the air pressure in the reservoir is vented.

Figure 1:
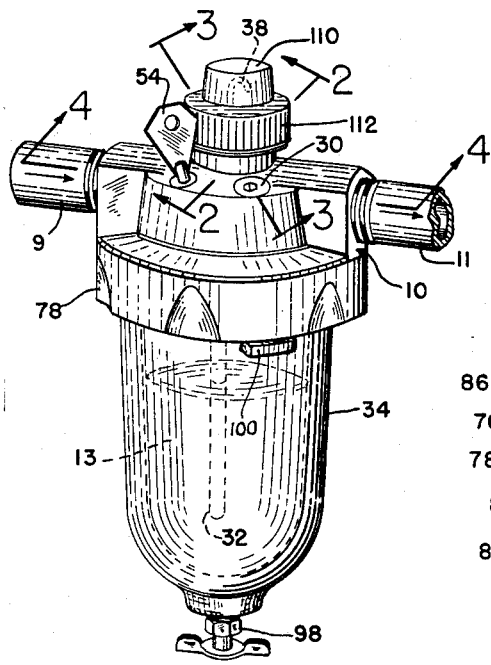
FIG. 1 is a perspective, generally side elevational view of a lubricator embodying the invention connected in a compressed air line used for pneumatic tools.

In FIG. 1 a lubricator body 10 is shown connected in a compressed air line with an input coupling at 9 and an output coupling at 11. A bowl 34 is secured to the body releasable by a lock ring 78 to provide a unitized lubricator with an oil reservoir 13. The main portion of the air supplied to the pneumatic device is conducted into the inlet 12 of the housing 10 and through a venturi having a square throat 14 then through a vertically disposed cross bore 16, out through the enlarged downstream side 18, and into the downstream conduit 11.

Figure 3:
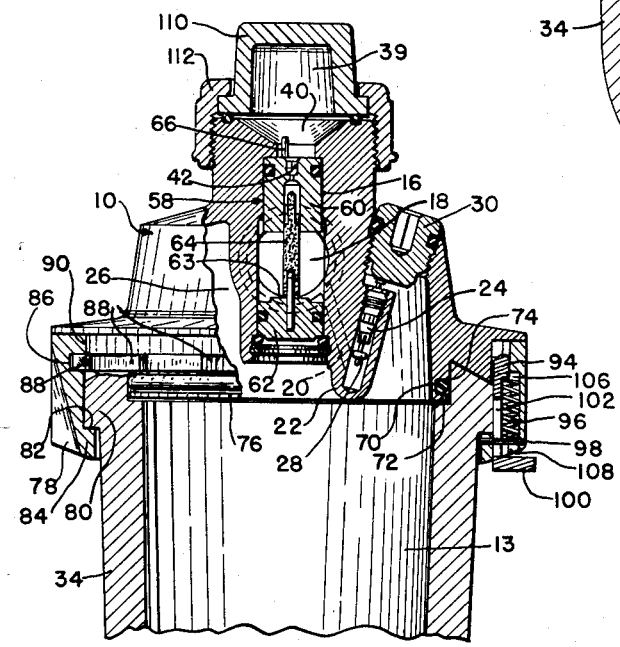
FIG. 3 is a vertical section essentially through the head portion taken on line 3—3 in FIG. 1.

A passage 20 leads from the upstream side 12 through a boss 22 and through a valve chamber 24 into the top portion 26 of the lubricant reservoir 13 (FIG. 3). A check valve 28 closing in the direction of flow of air through passage 20 is actuated by a filler plug 30. When the filler plug is in place, as shown threaded into the housing 10 (FIG. 3), the valve 28 is held open against the closing force of air flowing through it. Then whenever the filler plug 30 is removed, the check valve 28 is forced to close by the air moving therethrough. Closure of the valve cuts off the supply of pressure to the lubricant reservoir through passage 20. The filler plug 30 can be loosened to vent the reservoir and close the valve whereupon the plug can be removed if desired to replenish the reservoir with oil.

Figure 2:
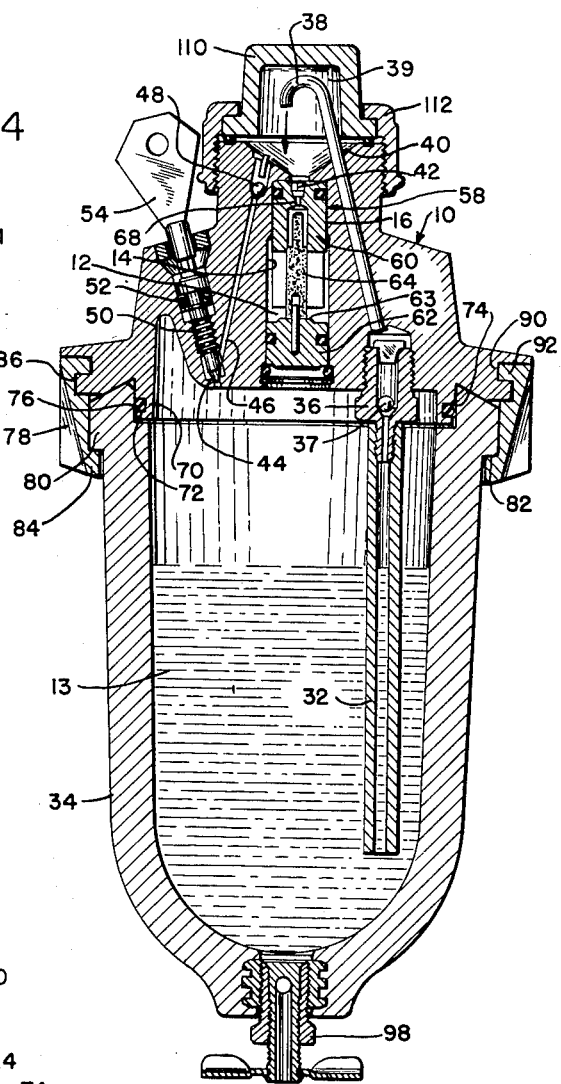
FIG. 2 is a vertical section through the lubricator taken upon the radial plane represented by line 2—2 in FIG. 1.

It will be observed in FIG. 2 that a flexible oil eduction tube 32 extends to a point near the bottom of the reservoir bowl 34 as mounted upon a check valve fitting 36 having a ball check 37 therein closing with the back flow of oil upwardly through the tube 32. The upper end or downstream side of the fitting leads to an oil drip nozzle 38 located in a drop or oil supply chamber 39 above a conical cavity 40 in the top of the housing 10. The cavity 40 is in communication with the upper end of the cross bore through an opening 42. Through this eduction conduit 32 oil flows from the lubricant storage compartment 13 past the valve 37 whenever the pressure is higher, and proportionately so, in the oil reservoir 13 than it is in the chamber 39.

The degree of the differential pressure between the chamber 39 and the oil reservoir 13 is controlled by an adjustable valve 44 located in a passage 46 leading from the top of the oil reservoir 13 to the chamber 39 past a back flow check valve 48. The valve 44 is threaded into the body 10 as at 50 and sealed against leakage as by an O-ring at 52 for rotation by a removable key 54. Adjustment of this valve determines the rate of oil dropping from the nozzle 38.

In order to diffuse and fog the oil entering the cross bore 16, a rotatable device 58 sealed at the top and the bottom as shown is employed comprising upper and lower plugs 60 and 62, respectively, journalled in the cross bore 16 and interconnected by a porous sintered metal blade 64 having a pore size of approximately 123 microns. The sintered metal employed is bronze and the facing ends of the plugs are shaped to retain the blade. The upper plug 60 is cross kerfed to receive the top edge of the blade 64 and the upper face of the lower plug 62 is provided with annular rib 63 embedded in the lower edge of the blade. The upper face of the upper plug is provided with a hexagonal bore 42 to pass the oil drops. Thus, pressure in the inlet 12 can reach the chamber 39 under some conditions but can go no further than check valves 37 and 48 when the reservoir 34 is vented to atmosphere upon removal of plug 30.

Whenever it becomes desirable to replenish the oil reservoir 13, the plug 30 can be loosened to vent the reservoir with back flow check valves 28, 37 and 48 closing to prevent air pressure from escaping. Then the plug 30 can be removed, and if the plug 30 is removed, the replenishing oil can be poured through the plug opening.

On the other hand, it is preferred to remove the bowl by actuation of a quickly manipulated retainer ring and just fill the open bowl 34 from a handy supply device and return it immediately to place with the ring snapped again into place.

This ring and attachment of the bowl will now be described. For purposes of releasably supporting the oil reservoir bowl on the body 10 a downwardly extending annular flange 70 having an external O-ring groove 72 therein is provided upon the bottom of the body 10. For mating therewith the upper end of the bowl 34 is offset outwardly to provide a cylindrical surface 74 which telescopes over flange 70 with sufficient clearance that it can be readily attached and removed. An O-ring 76 in the groove 72 seals the joint against escape of air under pressure.

The bowl is supported in said telescoping relationship by a quickly attached and detached ring 78. In providing this support, the bowl has a peripheral flange 80 that is provided a shoulder 82, and the ring 78 is provided with an inwardly extending flange 84 which engages and supports the flange 80 when in position to do so.

The ring 78 is locked against removal and for this purpose is provided with an internal groove at 86 which mates with annular male flange segments 88 upon the body 10. Also, the body 10 is provided with a groove 90 which mates with annular female segments 92 located adjacent to the upper edge of the ring 78. The flange segments 86 and 92 serve in the nature of bayonet joint elements since the segments in one member slip between the segments in the other member so that they come to meet in the cooperating grooves as described, whereupon a slight turning of the ring brings the segments in axial abutting relationship to support the bowl 34 against downward movement.

For purposes of ready engagement and disengagement, the tolerances are quite large for the segments and can be engaged or disengaged by relative rotation in either direction. However, to lock the segments in abutting relationship, a latch 94 (FIG. 3) is provided upon the ring 78 in a space between two of the segments 92 (FIG. 2). The upper end of the latch intersects the groove 86 in the ring 78 and is spring urged in an upward direction by a compression spring 96 held in place by a cross pin 98. The lower end of the latch has a radial lip 100 thereon serving as a combination stop and manual means for operating the latch. A longitudinal groove 102 is provided through the latch to allow for the pin 98 during movement of the latch. The spring is located in an external groove 106 upon the latch and the latch extends through an opening 108 through the flange 84 where it is held in guided relationship by the flange 84. Some space is provided between the upper end of the latch and the upper edge of the flange segments 92.

Assuming the reservoir 34 as being already detached for filling with lubricant, the ring 78 is slipped into place over the bottom of the reservoir and the reservoir is raised to its sealed position telescoping with flange 70 on the body 10. After this the ring is moved upwardly and rotated slightly until the flange segments interdigitate whereupon one of the flange segments 88 is in engagement with the upper end of the latch 94. Further movement of the ring depresses the latch to locate the flange segments in their respective grooves whereupon the ring is turned until the latch snaps upwardly between two of the flange segments 88 on the body 10. This disposes the segments in abutting relationship for supporting the bowl 34 against removal. While pressure is present in the bowl, the engaged flange segments are heavily loaded frictionally to prevent inadvertent rotation and disengagement. Moreover, it will be observed that the latch can be received between any two adjacent segments 88 which permits orientation for accessibility of the latch a full 360° around the lubricator.

When it is desired to remove the bowl 34, the filler plug 30 is manipulated to vent the reservoir space 13, the latch 94 is pulled downwardly by its radial lip 100 to clear the body segments 88 and a slight twist thereof interdigitates the segments so that the ring 78 can be lowered and the bowl 34 with it. In this connection it is to be noted that the tube 32 is flexible so that it will not be broken by any lateral movement of the bowl 34 during engagement or disengagement thereof and the ring and latch can be managed with one hand.

As will be observed in FIGS. 1 and 2, a drain valve 98 is provided in the bottom of the bowl 34 for use if desired. Opening this valve slightly while pressure is present in the reservoir 13 will rapidly exhaust the oil or sediment from the bowl 34.

Although a rugged aluminum bowl can be used where solvent vapors or other fluids might damage plastics or where operating pressures up to 250 pounds per square inch might be employed, it is preferred to use plastic bowls which are reinforced with wire mesh where working pressures will not exceed 150 pounds per square inch. It is desirable to use the wire reinforced plastic bowls since they are transparent. A 360° sight cap or dome 110 sealing the chamber 39 and nozzle 38 is secured in sealed relationship by a flange nut 112 and is also preferably made of transparent plastic so that visual observation will reveal by oil drop frequency how much oil is entering the air line. The greater the air flow the greater will be the pressure differential and the flow of oil.

Thus having described the preferred embodiments of the invention, it will be readily apparent to those skilled in the art that various and further changes can be made therein within the objects set forth without departing from the spirit of the invention, the scope of which is commensurate with the appended claims.

What is claimed is:

1. In a compressed air line system having a body member provided with a passage for conducting pressurized air therethrough and a removable bowl receiving air from said passageway and having a radial flange around the upper end thereof for supporting the bowl on said body member when pressurized, the combination of
   means for venting said bowl of air under pressure,
   said bowl and body member having loosely engaging anular portions telescoping in an axial direction,
   sealing means between said telescoping portions including an annular resilient sealing member carried by one of the telescoping portions for engaging the other telescoping portion in a radial direction in axially slidable pressure sealing relationship,
   a ring member engaging said flange on the bowl in supporting relationship, said ring member including adjacent to its edge that is remote from said bowl a set of circumferentially spaced radially projecting segmented annular flange elements having a uniform axial contour throughout their lengths upon their side that is remote from said edge,
   a corresponding set of circumferentially spaced radially projecting segmented annular flange elements upon said body member having a uniform axial contour throughout their lengths mating with the first mentioned axial contour,
   manually released latch means carried by one of said members for axial movement transversely to its flange elements in the space between two of its flange elements,
   said sets of flange elements interdigitating with each other upon relative axial movement therebetween with the spaces between one set being substantially equal to the length of the elements of the other set so that each set passes through the spaces of and beyond the other set for relative rotation of the sets in alternate directions, one of the flange elements on the other of said members engaging and cocking the latch upon said axial movement and said latch snapping into the space between two flange elements on said one member upon rotation of the flange elements of one set into axial overlapping position with the other set to lock the ring member against relative release rotation in both directions, and
   means for applying air pressure to said reservoir bowl urging said sealing means into sealing relationship and said overlapping sets of flange elements axially into heavy frictional engagement with each other.

2. The combination called for in claim 1 in which said one of said members carrying the latch means has an axially extending slot through the wall thereof at said space between said two flange elements, and said latch means includes,
   an external handle on one side of the slot,
   an internal element in said space of a circumferential length approximately equal to that of said space,
   an intermediate portion interconnecting said handle and internal element disposed in said slot in guided relationship, and resilient means interconnecting said ring and internal element urging said internal element into latch engagement.

3. In a compressed air line system having a body member provided with a passage for conducting pressurized air therethrough and a removable bowl receiving air from said passageway and having a flange rim means around the upper end thereof for supporting the bowl on said body member when pressurized, the combination of means for venting said bowl of air under pressure, said bowl and body member having loosely engaging annular portions telescoping in an axial direction, sealing means between said telescoping portions including an annular resilient sealing member carried by one of the telescoping portions for engaging the other telescoping portion under pressure in a radial direction in axially slidable pressure sealing relationship, a ring member engaging said flange on the bowl in supporting relationship and including at its circumference adjacent to the edge thereof remote from said bowl a set of circumferentially spaced radially projecting segmented annular flange elements having a uniform axial contour throughout their lengths upon their side remote from said edge with their length and the length of the spaces between being equal to the circumference, a corresponding set of circumferentially spaced radially projecting segmented annular flange elements upon said body member having a uniform axial contour mating with the first mentioned mating contour throughout their lengths, manually released latch means carried by one of said members for axial movement transversely to its flange elements in the space between two of its flange elements, said sets of flange elements interdigitating with each other upon relative axial movement therebetween with the spaces between each set receiving the elements of the other set therethrough so that each set passes beyond the other set for relative rotation of the sets in alternate directions, one of the flange elements on the other of said members engaging and cocking the latch upon said axial movement and said latch snapping into the space between two flange elements on the one member upon rotation of the flange elements of one set into axial overlapping position with the other set to lock the ring member against relative release rotation in both directions and means for applying air pressure to said reservoir bowl urging said sealing means into sealing relationship and said overlapping sets of flange elements axially into heavy frictional engagement with each other.

4. In a compressed air line system having a body member provided with a passage for conducting pressurized air therethrough and a removable bowl receiving air from said passageway and having a supporting radial flange around the upper end thereof for supporting the bowl on said body member when pressurized, the combination of means for venting said bowl of air under pressure, said bowl and body member having loosely engaging annular portions telescoping in an axial direction, sealing means between said telescoping portions including an O-ring carried by one of the telescoping portions for engaging the other telescoping portion in a radial direction in axially slidable pressure sealing relationship, a ring member engaging said flange on the bowl in supporting relationship having a circumferential groove therein bordering a set of circumferentially spaced segmented annular flange elements of uniform cross section throughout their lengths, manually actuated latch means carried by said ring member for axial movement transversely in the space between two of said flange elements and normally intersecting said groove, a corresponding set of circumferentially spaced segmented annular flange elements of uniform cross section throughout their lengths upon said body member subtended by a circumferential groove, said sets of flange elements interdigitating with each other with the spaces between one set of elements being substantially equal to the length of the elements of the other set so that the sets on both members pass through the respective spaces and reach the grooves on the other members for relative rotation in alternate directions with one of the flange elements on the body member engaging and cocking the latch whereby said latch snaps into the space between two flange elements upon the body member to lock them against further rotation when the flange elements of one set are rotated with respect to the other set into axial overlapping positions, and means for applying air pressure to said reservoir bowl urging said sealing means into sealing relationship and said overlapping sets of flange elements axially into heavy frictional engagement with each other.

References Cited by the Examiner
UNITED STATES PATENTS

| 2,593,770 | 4/52 | Kollsman. | |
| 2,684,779 | 7/54 | Rafferty | 220—40 |
| 3,081,901 | 3/63 | Trishman | 220—40 |
| 3,102,660 | 9/63 | Bowden | 220—40 |
| 3,115,950 | 12/63 | Malec | 184—55 |

LOUIS G. MANCENE, *Primary Examiner.*

GEORGE E. LOWRANCE, THERON E. CONDON, *Examiners.*